April 12, 1955   C. H. BILLS   2,706,015
WASH TANK AND GAS SEPARATOR
Filed Oct. 15, 1953

CLAUD H. BILLS
INVENTOR.

BY Hazard & Miller
ATTORNEYS

# 2,706,015

WASH TANK AND GAS SEPARATOR

Claud H. Bills, Los Angeles, Calif., assignor to Superior Tank & Construction Company, Los Angeles, Calif., a corporation of California Application October 15, 1953, Serial No. 386,179

4 Claims. (Cl. 183—2.7)

This invention relates to improvements in wash tanks. The invention may be regarded as an improvement over the Sand, Water and Oil Segregator disclosed in my prior Patent No. 2,152,863, issued April 4, 1939.

Many oils that are produced from oil wells are in the form of water and oil emulsions. These oils frequently are of such a character that it is possible to effect a breaking of the emulsion or a separation of a material part of the entrained water from the oil. In my prior patent I have disclosed a segregator wherein the influent or emulsion produced from the well is conducted into a tank and is heated after which the emulsion is caused to pass through small perforations. The discharge of the heated emulsion through the perforations has the effect of breaking the emulsion so that a substantial amount of the water contained therein may settle out.

I have found that the separation of water from the oil can be materially increased if the emulsion, after being heated, is caused to pass consecutively beneath relatively sharp edges on downwardly directed louvers. The passage of the oil across these relatively sharp edges seems to have the effect of breaking the emulsion and causing the water content to separate out to a greater extent than where the emulsion is merely caused to pass through small perforations in a relatively thick metal wall.

It is, therefore, a primary object of the present invention to provide an improved wash tank wherein the influent produced from the well is conducted into the tank through a vertical column and after descending therethrough is caused to flow rapidly beneath the sharp edges of downwardly directed louvers so that a maximum separation of water from oil can be secured. This influent may be heated as it descends in the column but heating is not necessary in all circumstances as many oils are hot enough as produced to furnish the required heat and in others no heat is required.

Figure 1:
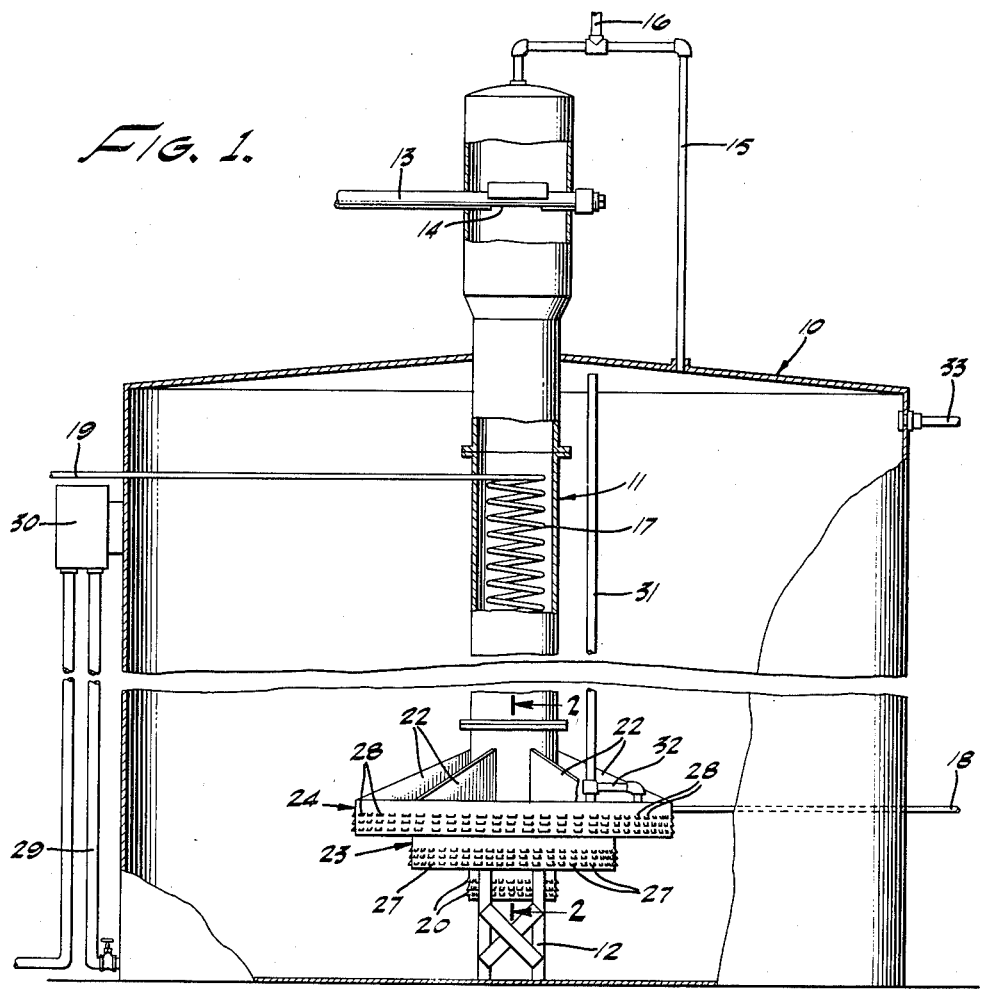
Figure 2:
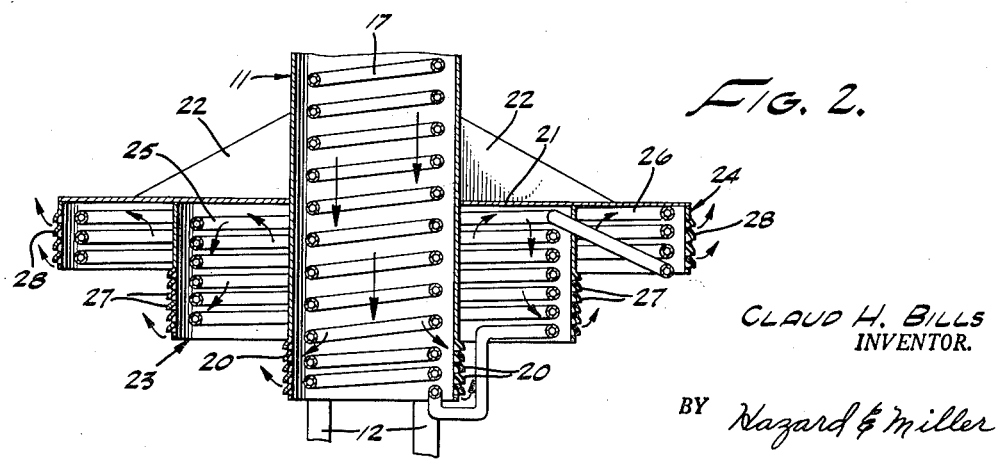

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation, parts being broken away, and shown in vertical section, of a wash tank embodying the present invention; and Fig. 2 is a vertical section taken substantially upon the line 2—2 upon Fig. 1 in the direction indicated.

Referring to the accompanying drawings wherein similar reference characters designate similar parts throughout, the improved wash tank comprises a tank 10 at the center of which there is a vertical conduit 11 supported within the tank by a suitable supporting structure 12. The pipe 13 conducts the emulsion produced by the well to the interior of the conduit 11 adjacent its top and openings 14 therein permit this influent to be discharged in the top of the conduit. Gas is frequently present in the influent and this gas, on being released in the top of the conduit 11, may flow into a gas loop 15 and pass out through a gas outlet 16. The water and oil emulsion descends through the conduit 11 and is heated therein by a heating coil 17 which is supplied with a hot fluid through an inlet 18 which passes out of the coil through an outlet 19. The very bottom of the conduit 11 is open but the walls adjacent the bottom of the conduit have a plurality of small downwardly directed louvers 20 struck outwardly. These louvers present relatively long, horizontal edges that are downwardly directed and which are relatively thin so that as the heated emulsion approaches the bottom of the conduit 11 the emulsion may pass outwardly through these louvers and across these relatively sharp horizontal edges. Some distance above the bottom of the conduit 11 there is a horizontal circular plate 21 secured thereto. This plate is braced by gusset plates 22 and serves as a support for downwardly extending baffles 23 and 24. These baffles are cylindrical in form and are concentrically arranged with relation to the conduit 11. They may have heating coils 25 and 26 disposed therein which are connected with the heating coil 17. The lower portions of these baffles are also equipped with outwardly struck-out louvers 27 and 28 that also provide relatively thin, sharp, downwardly-directed horizontal edges. The group of louvers 27 in the baffle 23 is disposed at a higher elevation than the group of louvers 20 in the walls of the conduit 11. Similarly the group of louvers 28 in the baffle 24 is disposed at a higher elevation than the group of louvers 27. In this manner, after the heated emulsion has passed beneath the edges of the louvers 20 it may rise about the conduit 11 within the baffle 23. As the emulsion flows outwardly or away from the conduit 11 its velocity is reduced so that it passes beneath the sharp edges of the louvers 27 at a lower velocity. After passing through these louvers the emulsion again rises within the baffle 24 and passes beneath the sharp edges of the louvers 28 at a still lower velocity. This treatment of the emulsion causes a large percentage of the water ingredient in the influent to settle out of the emulsion and collect in the bottom of the tank. This water finds egress from the tank through a water outlet 29 which has a weir box 30. There is preferably a standpipe 31 leading from the top of the space between the baffle 23 and the conduit 11 to the top of the tank. This standpipe has a branch 32 leading from the space between the baffle 23 and the baffle 24. Any gas that may continue to separate from the emulsion while it is flowing through the baffles can be conducted through the standpipe to the top of the tank and may find egress through the gas outlet 16 through the gas loop 15. The clean oil that collects in the top of the tank is conducted therefrom through a clean oil outlet indicated at 33.

Some oils in addition to containing entrained water also contained entrained sand. The sand ingredient is usually caused to settle out along with the water and may be carried with the water from the tank. If not, the bottom of the tank may be cleaned of sand periodically through a main hole therein or any equivalent structure.

From the above described construction it will be appreciated that an improved wash tank has been provided which is of relatively simple and highly durable construction. By causing the influent to pass progressively across the thin horizontal edges of the louvers and at progressively decreasing velocities, a substantial amount of water can be removed from the oil prior to the oil being delivered to the outlet 33 and conducted to storage tanks or for shipping.

Various changes may be made in the details of construction without departing from the spirit and scope of the invention as defined by the appended claims.

I claim:

1. A wash tank comprising a tank, a conduit extending downwardly into the tank, heating means in the conduit, means for discharging influent into the conduit adjacent the upper end thereof to pass downwardly therethrough and be discharged from the lower end thereof into the tank, there being outwardly struck-out louvers in the wall of the conduit adjacent its lower end presenting relatively sharp downwardly directed horizontal edges across which the influent may flow, one or more baffles concentrically arranged around the lower end of the conduit, said baffles also having outwardly struck-out louvers presenting relatively sharp downwardly directed horizontal edges across which the influent may flow, the louvers and the baffles being arranged at progressively higher elevation, and means providing gas, clean oil and water outlets from the tank.

2. A wash tank comprising a tank, a conduit extending downwardly into the tank, heating means in the conduit, means for discharging influent into the conduit adjacent the upper end thereof to pass downwardly therethrough and be discharged from the lower end thereof into the tank, there being outwardly struck-out louvers in the wall of the conduit adjacent its lower end presenting relatively sharp downwardly directed horizontal edges across which the influent may flow, one or more baffles concentrically arranged around the lower end of the conduit, said baffles also having outwardly struck-out louvers presenting relatively sharp downwardly directed horizontal edges across which the influent may flow, the louvers and the baffles being arranged at progressively higher elevation, means providing gas, clean oil and water outlets from the tank, and heating means within each of the baffles.

3. A wash tank comprising a tank, a conduit extending downwardly into the tank, heating means in the conduit, means for discharging influent into the conduit adjacent the upper end thereof to pass downwardly therethrough and be discharged from the lower end thereof into the tank, there being outwardly struck-out louvers in the wall of the conduit adjacent its lower end presenting relatively sharp downwardly directed horizontal edges across which the influent may flow, a horizontal plate secured to the conduit above the lower end thereof, one or more baffles secured to the underside of the plate and concentrically arranged about the conduit, said baffles having outwardly struck-out louvers formed therein presenting relatively sharp downwardly directed horizontal edges across which the influent may flow, the louvers in the baffles being arranged in groups which groups are at progressively higher elevations, and means providing gas, clean oil and water outlets from the tank.

4. A wash tank comprising a tank, a conduit extending downwardly into the tank, means for discharging influent into the conduit adjacent the upper end thereof to pass downwardly therethrough and be discharged from the lower end thereof into the tank, there being outwardly struck-out louvers in the wall of the conduit adjacent its lower end presenting relatively sharp downwardly directed horizontal edges across which the influent may flow, one or more baffles concentrically arranged around the lower end of the conduit, said baffles also having outwardly struck-out louvers presenting relatively sharp downwardly directed horizontal edges across which the influent may flow, the louvers and the baffles being arranged at progressively higher elevation, and means providing gas, clean oil and water outlets from the tank.

References Cited in the file of this patent
UNITED STATES PATENTS

| Number | Name | Date |
| --- | --- | --- |
| 411,646 | Dorn et al. | Sept. 24, 1889 |
| 1,675,775 | Umbarger | July 3, 1928 |
| 1,756,862 | Holford | Apr. 29, 1930 |
| 2,152,863 | Bills | Apr. 4, 1939 |